(12) United States Patent
Hoshino et al.

(10) Patent No.: US 6,363,375 B1
(45) Date of Patent: Mar. 26, 2002

(54) CLASSIFICATION TREE BASED INFORMATION RETRIEVAL SCHEME

(75) Inventors: Takashi Hoshino, Yokosuka; Yasushi Hasegawa; Giichi Kishimoto, both of Yokohama; Kinji Kato, Yokosuka; Tsuyoshi Hayashi, Kakamigahara, all of (JP)

(73) Assignee: Nippon Telegraph and Telephone Company, Tokyo (JP)

( * ) Notice: Subject to any disclaimer, the term of this patent is extended or adjusted under 35 U.S.C. 154(b) by 0 days.

(21) Appl. No.: 09/410,146

(22) Filed: Sep. 30, 1999

(30) Foreign Application Priority Data

Sep. 30, 1998 (JP) ............................................ 10-277909
Mar. 1, 1999 (JP) ............................................ 11-053344

(51) Int. Cl.[7] .............................................. G06F 17/30
(52) U.S. Cl. ...................... 707/3; 707/2; 707/4; 707/5; 707/103
(58) Field of Search ................................ 707/103, 2, 3, 707/4, 5

(56) References Cited

U.S. PATENT DOCUMENTS

| | | | | |
|---|---|---|---|---|
| 5,201,047 A | * | 4/1993 | Maki et al. ................... | 707/103 |
| 5,404,295 A | * | 4/1995 | Katz et al. ............. | 364/419.19 |
| 5,829,004 A | * | 10/1998 | Au .............................. | 707/100 |
| 5,870,735 A | * | 2/1999 | Agrawal et al. ............... | 707/3 |
| 5,899,992 A | * | 5/1999 | Iyer et al. ...................... | 707/7 |
| 6,012,069 A | * | 1/2000 | Shibazaki ..................... | 707/104 |
| 6,078,913 A | * | 6/2000 | Aoki et al. ...................... | 707/2 |
| 6,138,115 A | * | 10/2000 | Agrawal et al. ............... | 707/3 |
| 6,292,797 B1 | * | 9/2001 | Tuzhilin et al. ................ | 707/6 |
| 6,298,340 B1 | * | 10/2001 | Calvignac et al. ............. | 707/3 |

FOREIGN PATENT DOCUMENTS

| | | |
|---|---|---|
| JP | 7-44447 | 2/1995 |
| JP | 9-198295 | 7/1997 |
| JP | 10-31615 | 3/1998 |

OTHER PUBLICATIONS

Wu et al., Identifing Faces Using Multiple Retrievals, 1994, IEEE, pp. 27–38.*
Amit et al., Joint Induction of Share Features and Tree Classifiers, 1997, IEEE, pp. 1300–1305.*
Wu, Content–Based Indexing of Multimedia Databases, 1997, IEEE, pp. 978–989.*
T. Hotta and Y. Miyake, Hypertext Transfer Protocol (HTTP) , OPEN DESIGN, No. 13, pp. 13–22, 4/96, CG Publishing Co. Ltd.
R. Duncan, Programming OS/2 I, *Kernel Programming*, pp. 141–143, 4/90, ASCII Corp.

(List continued on next page.)

*Primary Examiner*—Frantz Coby
(74) *Attorney, Agent, or Firm*—Kilpatrick Stockton LLP

(57) ABSTRACT

An information retrieval scheme using classification trees with respect to a plurality of information sources connected to a network is disclosed, where each classification tree having a hierarchical structure defined in terms of entries. In the information retrieval apparatus, classification tree class information for each classification tree class defined among entries constituting each classification tree is managed, where each classification tree class information indicating retrieval condition parameters for each classification tree class. Then, the information retrieval is controlled by receiving from a user a retrieval request indicating a retrieval target entry that was obtained by the user by tracing the classification trees, generating retrieval commands with respect to selected information sources among said plurality of information sources by referring to each classification tree class information corresponding to the retrieval target entry that is managed by the class definition unit, obtaining a retrieval result of a retrieval with respect to the selected information sources using the retrieval commands, and returning the retrieval result to the user.

48 Claims, 13 Drawing Sheets

OTHER PUBLICATIONS

K. Nishida, Netscape Server On–Stage 3. Directory Server 1, Computer & Network LAN, vol. 16, No. 4, pp. 107–112, 4/98, Ohm Co. Ltd.

T. Hashi, Explanation of Internet Extension Message Specification MIME, OPEN DESIGN, Interface Issue, No. 8, pp. 104–115, May 1995, CG Publishing Co. Ltd.

* cited by examiner

| CLASS NAME | OBJECT CLASS | ATTRIBUTE | RETRIEVAL CONDITION ITEM NAME | RETRIEVAL CONDITION GROUP IDENTIFIER | RETRIEVAL CONDITION VALUE ATTRIBUTE NAME | COMPARISON OPERATOR | RETRIEVAL CONDITION CONJUNCTION |
|---|---|---|---|---|---|---|---|

| CLASS NAME | INFORMATION SOURCE TYPE | RETRIEVAL ITEM NAME |
|---|---|---|

FIG. 6A

| HOTEL TYPE | NAME | AREA | ADDRESS | TELEPHONE NUMBER |
|---|---|---|---|---|
| CITY HOTEL | CITY HOTEL A | YOKOHAMA | YOKOHAMA, WEST, AREA A | xxx-xxx-xxxx |
| INN | INN B | YOKOHAMA | YOKOHAMA, WEST, AREA B | xxx-xxx-xxxx |
| BUSINESS HOTEL | BUSINESS HOTEL C | YOKOHAMA | YOKOHAMA, NORTH, AREA B | xxx-xxx-xxxx |
| BUSINESS HOTEL | BUSINESS HOTEL D | SHINJUKU | SHINJUKU, AREA D | xxx-xxx-xxxx |

FIG. 6B

| CLASSIFICATION | HOTEL NAME | FEE | ADDRESS | TELEPHONE NUMBER |
|---|---|---|---|---|
| BUSINESS HOTEL | BUSINESS Y | 7500 | YOKOHAMA, NORTH, AREA B | xxx-xxx-xxxx |
| BUSINESS HOTEL | BUSINESS Z | 8000 | KAWASAKI, KAWASAKI, SAKAE | xxx-xxx-xxxx |
| INN | INN A | 12000 | YOKOHAMA, SOUTH, MINATO | xxx-xxx-xxxx |
| LEISURE HOTEL | RESORT A | 18000 | URAYASU, MINAMI | xxx-xxx-xxxx |

FIG. 8A

| CLASS NAME | OBJECT CLASS | ATTRIBUTE | RETRIEVAL CONDITION GROUP IDENTIFIER | RETRIEVAL CONDITION ITEM NAME | RETRIEVAL CONDITION VALUE ATTRIBUTE NAME | COMPARISON OPERATOR | RETRIEVAL CONDITION CONJUNCTION |
|---|---|---|---|---|---|---|---|
| FACILITY GENRE | GENRE | GENRE, CLASS NAME | 1 | TYPE | GENRE | = | Null |
| HOTEL | HOTEL | TYPE, CLASS NAME | 1 | HOTEL TYPE | TYPE | = | Null |
| | | | 2 | CLASSIFICATION | CLASS | = | Null |
| RESTAURANT | RESTAURANT | CUISINE STYLE, CLASS NAME | 1 | RESTAURANT TYPE | CUISINE STYLE | = | Null |

FIG. 8B

| CLASS NAME | RETRIEVAL ITEM NAME |
|---|---|
| TOURIST FACILITY DATABASE | HOTEL FACILITY TABLE. HOTEL TYPE |
| | HOTEL FACILITY TABLE. NAME |
| | HOTEL FACILITY TABLE. ADDRESS |
| | HOTEL FACILITY TABLE. TELEPHONE NUMBER |
| HOTEL GUIDE DATABASE | HOTEL TABLE. CLASSIFICATION |
| | HOTEL TABLE. HOTEL NAME |
| | HOTEL TABLE. ADDRESS |
| | HOTEL TABLE. TELEPHONE NUMBER |
| URL DIRECTORY | CLASSIFICATION |
| | URL |
| | ABSTRACT |

FIG. 9

RETRIEVAL REQUEST FROM RETRIEVAL PROGRAM

| INFORMATION CLASSIFICATION | RETRIEVAL ITEM | RETRIEVAL CONDITION |
|---|---|---|
| BUSINESS | HOTEL TYPE<br>NAME<br>ADDRESS<br>TELEPHONE NUMBER | AREA = "YOKOHAMA" |

FIG. 10

INFORMATION RETRIEVAL COMMAND

| INFORMATION SOURCE TYPE | INFORMATION SOURCE NAME | RETRIEVAL ITEM | RETRIEVAL CONDITION |
|---|---|---|---|
| DATABASE | TOURIST FACILITY DATABASE | HOTEL TYPE<br>NAME<br>ADDRESS<br>TELEPHONE NUMBER | HOTEL TYPE = "BUSINESS HOTEL" |

FIG. 11

INFORMATION RETRIEVAL COMMAND (AFTER ADDING CONDITION)

| INFORMATION SOURCE TYPE | INFORMATION SOURCE NAME | RETRIEVAL ITEM | RETRIEVAL CONDITION |
|---|---|---|---|
| DATABASE | TOURIST FACILITY DATABASE | HOTEL TYPE<br>NAME<br>ADDRESS<br>TELEPHONE NUMBER | HOTEL TYPE = "BUSINESS HOTEL" AND AREA="YOKOHAMA" |

FIG. 12

INFORMATION SOURCE CONNECTION INFORMATION

| CLASS NAME | INFORMATION SOURCE TYPE | INFORMATION SOURCE NAME | HOST NAME | ACCOUNT | PASSWORD | SUPPLEMENTARY CONNECTION INFORMATION |
|---|---|---|---|---|---|---|
| TOURIST FACILITY DATABASE | DATABASE | TOURIST FACILITY DB | Host1 | User1 | ********** | (NULL) |
| HOTEL GUIDE DATABASE | DATABASE | HOTEL GUIDE DB | Host2 | User2 | ********** | (NULL) |
| URL RETRIEVAL DIRECTORY | DIRECTORY | ldap://foo.bar:390/ | Host3 | User3 | ********** | o = webusr1 |

FIG. 13

INFORMATION SOURCE RETRIEVAL RESULT

| HOTEL TYPE | NAME | AREA | ADDRESS | TELEPHONE NUMBER |
|---|---|---|---|---|
| BUSINESS | BUSINESS C | YOKOHAMA | YOKOHAMA, NORTH, AREA B | ×××-×××-×××× |

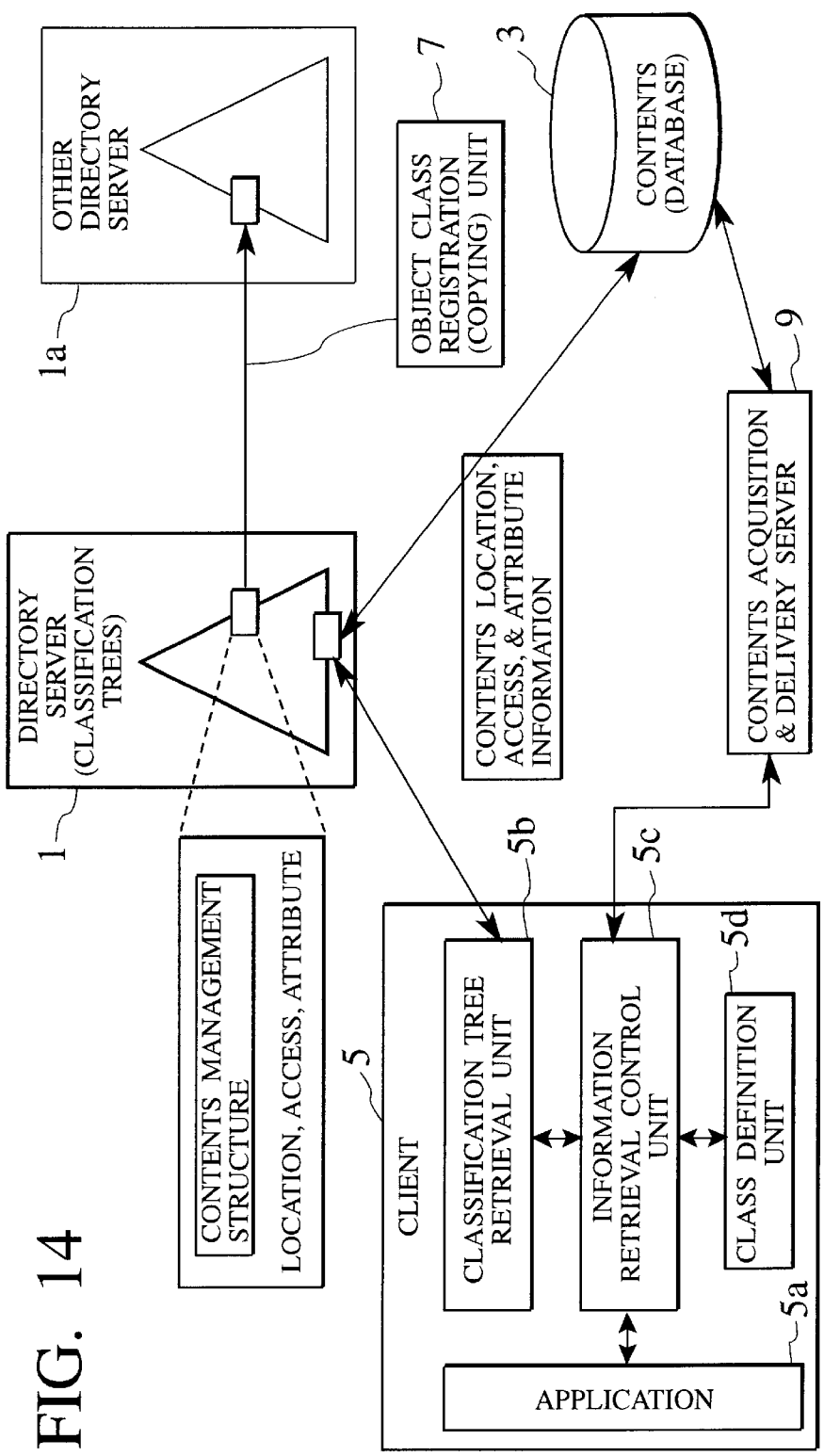

FIG. 17

| Entry name | Type | Subtype | WhereaboutInfo | Getinfo | Attributes |
|---|---|---|---|---|---|
| Image A | File | Mime | http://hostA/a.gif | image/gif gif | 1998.8.3 17:00 |

CLASSIFICATION TREE BASED INFORMATION RETRIEVAL SCHEME

BACKGROUND OF THE INVENTION

1. Field of the Invention

The present invention relates to a classification tree based information retrieval scheme which manages a classification tree of information and retrieval information of a plurality of information sources and carries out a retrieval with respect to a plurality of information sources such as databases by tracing entries stored in the classification tree of information.

2. Description of the Background Art

As a conventional classification based information retrieval, a URL retrieval system or a database retrieval system has been realized by classifying information provided at a WWW server or data stored in a database by using a hierarchical structure, and retrieving URL or data by specifying this classified information.

However, in such a conventional retrieval system, a classification tree has been produced for each retrieval system separately, so that the retrieval system and the classification tree, data and the classification tree, and the system and data have been inseparably defined.

A conventional classification tree based information retrieval system has been associated with the following problems.

(1) A classification tree produced in some retrieval system is constructed according to the data classification method and the database retrieval factors of that retrieval system so that it has been difficult to re-utilize this classification tree in other retrieval systems.

(2) In the case of changing a classification of data with respect to data already registered in a database, it has been necessary to change one or both of the classification of data stored in the database and the location information of these data that is managed by the classification tree, so that the change of the classification has not been easy.

(3) The retrieval items and the retrieval conditions are inseparably defined with the classification tree, so that there is no flexibility in the retrieval method.

Also, the conventional classification tree based URL retrieval system has been associated with the following problems.

(4) The URLs that are the retrieval targets have been managed as attributes of the classification tree, so that the classification tree must be updated whenever a URL is added/deleted.

(5) The classification is different depending on the URL retrieval systems even in the case of retrieving the same URL.

SUMMARY OF THE INVENTION

It is therefore an object of the present invention to provide an information retrieval scheme capable of realizing an information retrieval in which the information sources and the classification tree are defined separably, so that the construction of the information retrieval system using classification tree becomes easier, the reutilization and the sharing of a classification tree of information become possible, and the sharing of the information sources that are the retrieval targets becomes possible.

According to one aspect of the present invention there is provided an information retrieval apparatus using classification trees with respect to a plurality of information sources connected to a network, each classification tree having a hierarchical structure defined in terms of entries, the apparatus comprising: a class definition unit for managing classification tree class information for each classification tree class defined among entries constituting each classification tree, each classification tree class information indicating retrieval condition parameters for each classification tree class; and an information retrieval control unit for receiving from a user a retrieval request indicating a retrieval target entry that was obtained by the user by tracing the classification trees, generating retrieval commands with respect to selected information sources among said plurality of information sources by referring to each classification tree class information corresponding to the retrieval target entry that is managed by the class definition unit, obtaining a retrieval result of a retrieval with respect to the selected information sources using the retrieval commands, and returning the retrieval result to the user.

According to another aspect of the present invention there is provided a method of information retrieval using classification trees with respect to a plurality of information sources connected to a network, each classification tree having a hierarchical structure defined in terms of entries, the method comprising the step of: managing classification tree class information for each classification tree class defined among entries constituting each classification tree, each classification tree class information indicating retrieval condition parameters for each classification tree class; and controlling an information retrieval by receiving from a user a retrieval request indicating a retrieval target entry that was obtained by the user by tracing the classification trees, generating retrieval commands with respect to selected information sources among said plurality of information sources by referring to each classification tree class information corresponding to the retrieval target entry that is managed by the managing step, obtaining a retrieval result of a retrieval with respect to the selected information sources using the retrieval commands, and returning the retrieval result to the user.

According to another aspect of the present invention there is provided a computer usable medium having computer readable program code means embodied therein for causing a computer to function as an information retrieval apparatus using classification trees with respect to a plurality of information sources connected to a network, each classification tree having a hierarchical structure defined in terms of entries, the computer readable program code means includes: first computer readable program code means for causing said computer to manage classification tree class information for each classification tree class defined among entries constituting each classification tree, each classification tree class information indicating retrieval condition parameters for each classification tree class; and second computer readable program code means for causing said computer to control an information retrieval by receiving from a user a retrieval request indicating a retrieval target entry that was obtained by the user by tracing the classification trees, generating retrieval commands with respect to selected information sources among said plurality of information sources by referring to each classification tree class information corresponding to the retrieval target entry that is managed by the first computer readable program code means, obtaining a retrieval result of a retrieval with respect to the selected information sources using the retrieval commands, and returning the retrieval result to the user.

Other features and advantages of the present invention will become apparent from the following description taken in conjunction with the accompanying drawings.

BRIEF DESCRIPTION OF THE DRAWINGS

FIGS. 6A and 6B are diagrams showing exemplary structure and contents for a tourist facility database and a hotel guide database used in a concrete example of the classification tree based information retrieval apparatus of FIG. 1.

FIGS. 8A and 8B are diagrams showing exemplary class definition for a classification tree class and an information source class used in a concrete example of the classification tree based information retrieval apparatus of FIG. 1.

FIG. 9 is a diagram showing an exemplary content of a retrieval request from a retrieval program used in a concrete example of the classification tree based information retrieval apparatus of FIG. 1.

FIG. 10 is a diagram showing an exemplary content of an information retrieval command used in a concrete example of the classification tree based information retrieval apparatus of FIG. 1.

FIG. 11 is a diagram showing an exemplary content of an information retrieval command after adding condition that is used in a concrete example of the classification tree based information retrieval apparatus of FIG. 1.

FIG. 12 is a diagram showing an exemplary content of information source connection information used in a concrete example of the classification tree based information retrieval apparatus of FIG. 1.

FIG. 13 is a diagram showing an exemplary content of an information retrieval result in a concrete example of the classification tree based information retrieval apparatus of FIG. 1.

FIG. 14 is a block diagram showing a configuration of a system using a classification tree based information retrieval apparatus according to the second embodiment of the present invention.

FIG. 15 is a diagram showing a contents management structure used in a directory server of the system of FIG. 14.

FIG. 17 is a diagram showing a concrete example of a contents management structure used in a directory server of the system of FIG. 16.

DETAILED DESCRIPTION OF THE PREFERRED EMBODIMENTS

Referring now to FIG. 1 to FIG. 13, the first embodiment of an information retrieval scheme according to the present invention will be described in detail.

Figure 1:
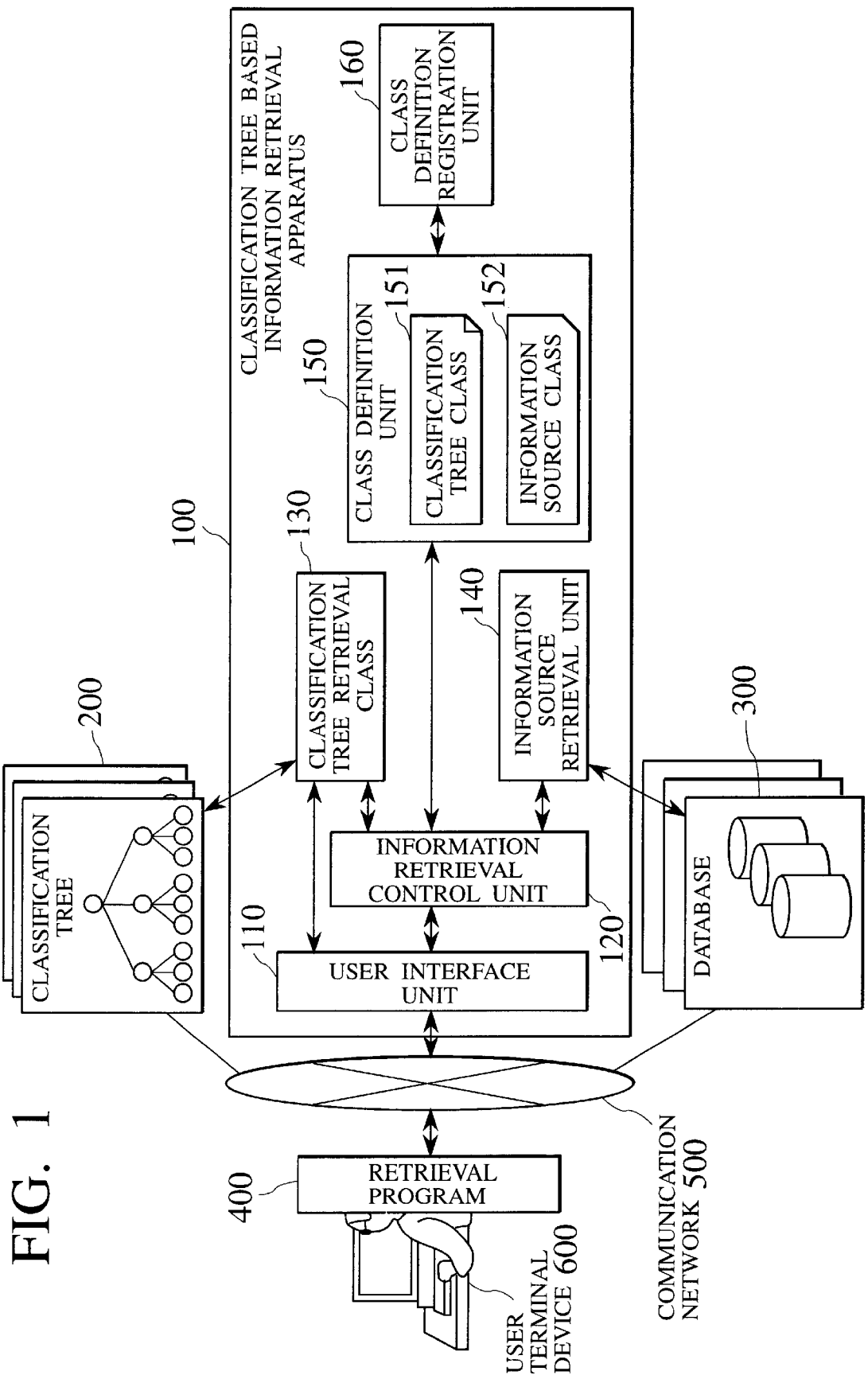
FIG. 1 is a block diagram showing a configuration of a classification tree based information retrieval apparatus according to the first embodiment of the present invention.

FIG. 1 shows a configuration of a classification tree based information retrieval apparatus according to the first embodiment of the present invention. In FIG. 1, a plurality of classification trees 200 and a plurality of database systems 300 are connected with each other through a communication network 500, as well as with a classification tree based information retrieval apparatus 100, while a user terminal device 600 is connected to the communication network 500 through a retrieval program 400. Note here that the classification trees 200 can be stored collectively in a single storage device or separately in a plurality of storage devices.

The classification tree based information retrieval apparatus 100 comprises a user interface unit 110, an information retrieval control unit 120, a classification tree retrieval unit 130, an information source retrieval unit 140, a class definition unit 150, and a class definition registration unit 160.

The user terminal device 600 can trace information classifications (entries) stored in the classification trees 200 using a hierarchical structure, through the user interface unit 110 using the retrieval program 400, and specify a retrieval target information. When the retrieval target information is reached, the user commands the retrieval execution with respect to the retrieval program 400. In response, the retrieval program 400 commands the retrieval execution with respect to the user interface unit 110.

The information retrieval control unit 120 receives a retrieval request containing a target information classification, a retrieval item, and a retrieval condition from the retrieval program 400 through the user interface unit 110. In addition, the information retrieval control unit 120 retrieves the classification tree 200 corresponding to the target information classification using the classification tree retrieval unit 130, extracts information necessary in retrieving the database 300 from the class definition unit 150 according to the retrieval result of the classification tree 200, and gives the extracted information to the information source retrieval unit 140. Then, the information retrieval control unit 120 retrieves the database 300 using the information source retrieval unit 140, and returns the retrieval result to the retrieval program 400 through the user interface 110.

The classification retrieval unit 130 generates a classification tree retrieval command from the retrieval request received from the information retrieval control unit 120, retrieves the classification tree 200 according to the classification tree retrieval command, and returns the retrieval result to the information retrieval control unit 120.

The classification tree retrieval unit 130 can also receive the retrieval request directly from the user interface 110, generate a classification tree retrieval command, retrieve the classification tree 200, and return the retrieval result to the retrieval program 400 through the user interface unit 110.

The information source retrieval unit 140 generates a database retrieval command from database retrieval parameters received from the information retrieval control unit 120, retrieves the database 300 according to the database retrieval command, and returns the retrieval result to the information retrieval control unit 120.

The class definition unit 150 defines and stores information for identifying a class of the classification tree and information to be retrieval condition parameters at a time of the database retrieval in the class as a classification class 151. The class definition unit 150 also defines and stores information such as database retrieval items as an information source class 152.

The class definition registration unit 160 carries out registration, correction, and deletion of the classification tree class 151 and the information source class 152 in the class definition unit 150.

The classification tree based information retrieval apparatus 100 carries out the two-step processing including a preparation phase in which the classification tree class 151 and the information source class 152 are defined before the retrieval is actually executed, and a retrieval phase for executing the actual retrieval.

Figure 3:
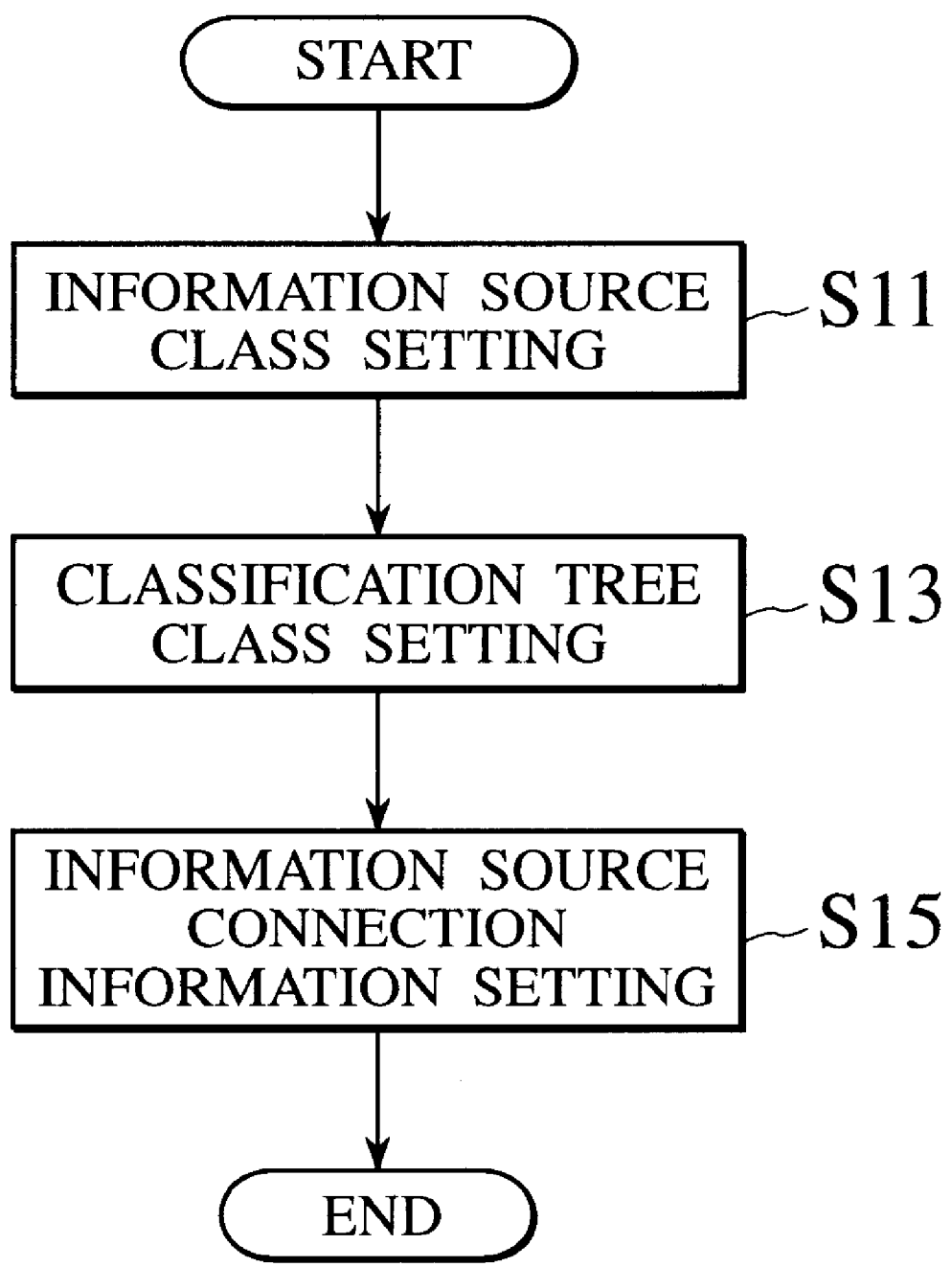
FIG. 3 is a flow chart for the processing procedure of a preparation phase in the class definition unit of the classification tree based information retrieval apparatus of FIG. 1.

First, the preparation phase will be described. In this preparation phase, the classification tree class, the information source class, and an information source connection information are defined by the class definition unit 150. As shown in FIG. 3, in the preparation phase, the setting of the information source class is carried out first (step S11), and the setting of the classification tree class is carried out (step S13), and then the setting of the information source connection information is carried out (step S15).

Figures 2A, 2B, 2C:
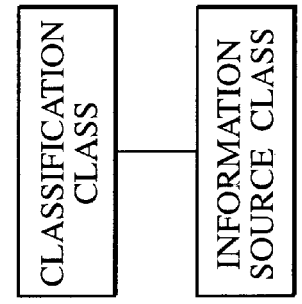
FIGS. 2A, 2B and 2C are diagrams showing configurations of a classification and an information source class and their hierarchical relationship that are stored in the class definition unit of the classification tree based information retrieval apparatus of FIG. 1.

The definitions of the classes for the classification trees and the information sources that are the retrieval targets are stored in the class definition unit 150 respectively as the classification tree class 151 and the information source class 152. The classification tree class and the information source class have a hierarchical relationship as shown in FIG. 2C where the information source class is always positioned at a lower level of the classification tree class. The further details of the classification class, the information source class, and the information source connection information are as follows.

(1) Classification tree class:

FIG. 2A shows a configuration of the classification class, where the following items are defined using the class definition registration unit 160 in order to identify a class to which an entry on the classification tree specified by the retrieval request belongs and obtain an information necessary for the database retrieval from that entry.

(i) Class name:

A name for identifying the class is set in this item.

(ii) Object class:

An object class to which the class belongs is defined in this item.

(iii) Attributes:

Attributes of the class are indicated in this item.

(iv) Retrieval condition:

This item indicates an attribute of the class which is to be used in generating the database retrieval parameters, and which is formed by a retrieval condition group identifier, a retrieval condition item name, a retrieval condition value attribute name, a comparison operator, and a retrieval condition conjunction. Here, a plurality of retrieval condition groups with respective identifiers can be defined for one class definition. The contents of these elements constituting the retrieval condition are as follows.

(a) Retrieval condition group identifier:

An identifier for identifying a group of items of the retrieval condition described below is set in this item. Note that each of the following items can be set in plural for one retrieval condition group.

(b) Retrieval condition item name:

A value obtained by a retrieval condition value attribute name to be described below is substituted, and a retrieval condition item in the database retrieval condition is indicated in this item.

(c) Retrieval condition value attribute name:

A value corresponding to the above described retrieval condition name in the database retrieval condition can be obtained from this item which indicates an attribute of the class.

(d) Comparison operator:

This item indicates a comparison operator for the retrieval condition item and the retrieval condition value, which is an operator to be used in specifying a relationship between the retrieval condition item and the retrieval condition value in the retrieval condition. Specifically, this item can take forms such as those of equality (=), inequality (>, <, $\geq$, $\leq$), non-coincidence, patial coincidence, etc.

(e) Retrieval condition conjunction:

This item indicates an operator to be used in specifying a connecting relationship among a plurality of retrieval condition items. Specifically, this item can take forms such as AND, OR, NULL (which implies the termination), etc.

(2) Information source class:

FIG. 2B shows a configuration of the information source class, where the following items indicating a type of information source, names of items that can be retrieved, etc., that are necessary in retrieving the information source, are defined using the class definition registration unit 160.

(i) Class name:

A name for identifying the information source is set in this item.

(ii) Retrieval item:

Names of items that can be retrieved in the retrieval target database are registered in a format concatenating a table name and a column name using "." in this item. Note that this item can be set in plural with respect to one class definition.

(3) Information source connection information:

The following items are specified as the information source concatenation information of the retrieval target.

(i) Class name:

This item indicates a name of the retrieval target information source.

(ii) Information source type:

This item indicates a type of the retrieval target information source.

(iii) Information source name:

This item indicates a name of the retrieval target information source.

(iv) Host name:

This item indicates a name of a host in which the retrieval target information source is stored.

(v) Account:

This item indicates a name of account that can retrieve the retrieval target information source.

(vi) Password:

This item indicates a password of the above account name.

(vii) Supplementary connection information:

This item indicates an information necessary in retrieving and transferring information, for each information source type.

Next, the retrieval phase will be described with reference to FIG. 4.

Figure 4:
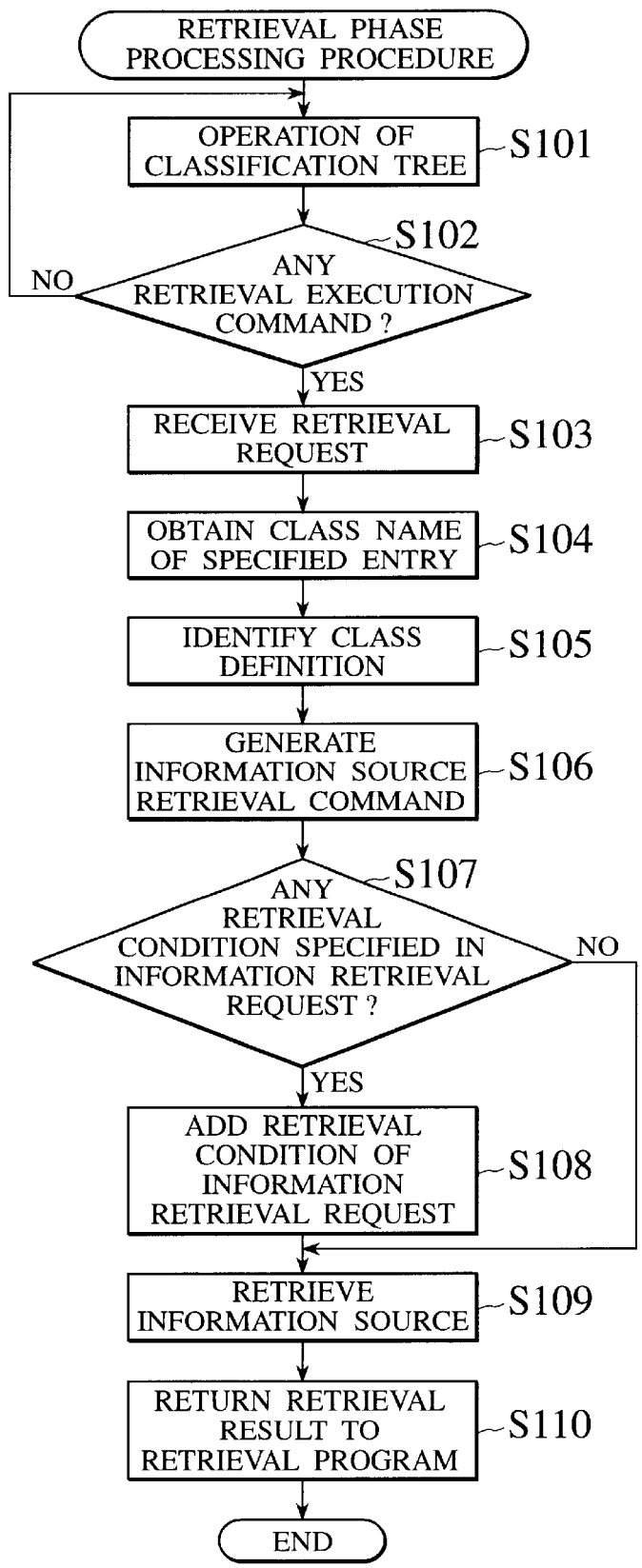
FIG. 4 is a flow chart for the processing procedure of a retrieval phase in the class definition unit of the classification tree based information retrieval apparatus of FIG. 1.

In FIG. 4, the user terminal device 600 first carries out an operation to trace the classification tree 200 until the retrieval target information classification (entry) stored in the classification tree 200 using the hierarchical structure is found, using the retrieval program 400 through the user interface unit 110 and the classification tree retrieval unit 130 (step S101). Then, whether there is a retrieval execution command from the user terminal device 600 or not is checked (step S102), and the processing proceeds to the step S103 if there is a retrieval execution command, whereas otherwise the processing returns to the step S101.

At the step S103, the user terminal device 600 issues the information retrieval execution command to the retrieval program 400 when the retrieval target entry is reached, such that the information retrieval control unit 120 receives the information retrieval request from the retrieval program 400 through the user interface unit 110. At this point, the information retrieval request received by the information retrieval control unit 120 comprises the retrieval item, the retrieval condition, and the information classification selected from the classification tree.

Next, the information retrieval control unit 120 obtains the class name of the information classification received by the retrieval request through the classification tree retrieval unit 130 (step S104). Then, the information retrieval control unit 120 identifies the classification class 151 according to the class name obtained at the step S104, and obtains the retrieval condition information (the retrieval condition item name, the retrieval condition value attribute name, the comparison operator, the retrieval condition conjunction) that is necessary for the information retrieval command generation (step S105).

Then, the information retrieval control unit 120 retrieves the information source class 152 in the class definition unit 150 according to the retrieval item of the information retrieval request received at the step S103, and obtains all the class names of the information source classes that satisfy the following items.

(i) The retrieval item of the information retrieval request is contained in the retrieval item names of the information source class 152.

(ii) The retrieval condition item name of the retrieval condition information obtained at the step S105 is contained in the retrieval item names of the information source class 152.

Next, the information source retrieval command comprising the following items is generated with respect to the information source having the class name that satisfies the above conditions (step S106).

(a) Information source type: A type of the information source class 152:

(b) Information source class name: An information source class name of the information source class 152:

(c) Retrieval item: A retrieval item of the information retrieval request received from the retrieval program 400: and (d) Retrieval condition: A retrieval condition information obtained at the step S105.

Next, the information retrieval control unit 120 judges whether the retrieval condition is specified in the information retrieval request received at the step S103 or not (step S107), and if it is specified the processing proceeds to the step S108, whereas otherwise the processing proceeds to the step S109. At the step S108, the retrieval condition of the information retrieval request is added to the retrieval condition of the information source retrieval command generated at the step S106. At the step S109, the information retrieval control unit 120 gives the information source retrieval command generated at the step S106 and the step S108 to the information source retrieval unit 140, and the information source retrieval unit 140 generates a command by which the information source can be retrieved from the information source retrieval command received from the information retrieval control unit 120 and executes the retrieval of the information source.

The information source retrieval unit 140 then returns the information source retrieval result obtained by the step S109 to the information retrieval control unit 120, and the information retrieval control unit 120 returns the retrieval result received from the information source retrieval unit 140 to the retrieval program 400 through the user interface unit 110 (step S110).

Now, the concrete example of the classification tree based information retrieval apparatus of this first embodiment will be described. This concrete example is directed to the case where the user specifies an information classification (entry) of the classification tree for the tourist facility information stored in a directory server, and retrieves type, name, address, and telephone number of a facility from a database that stores information belonging to that information classification.

Figure 5:
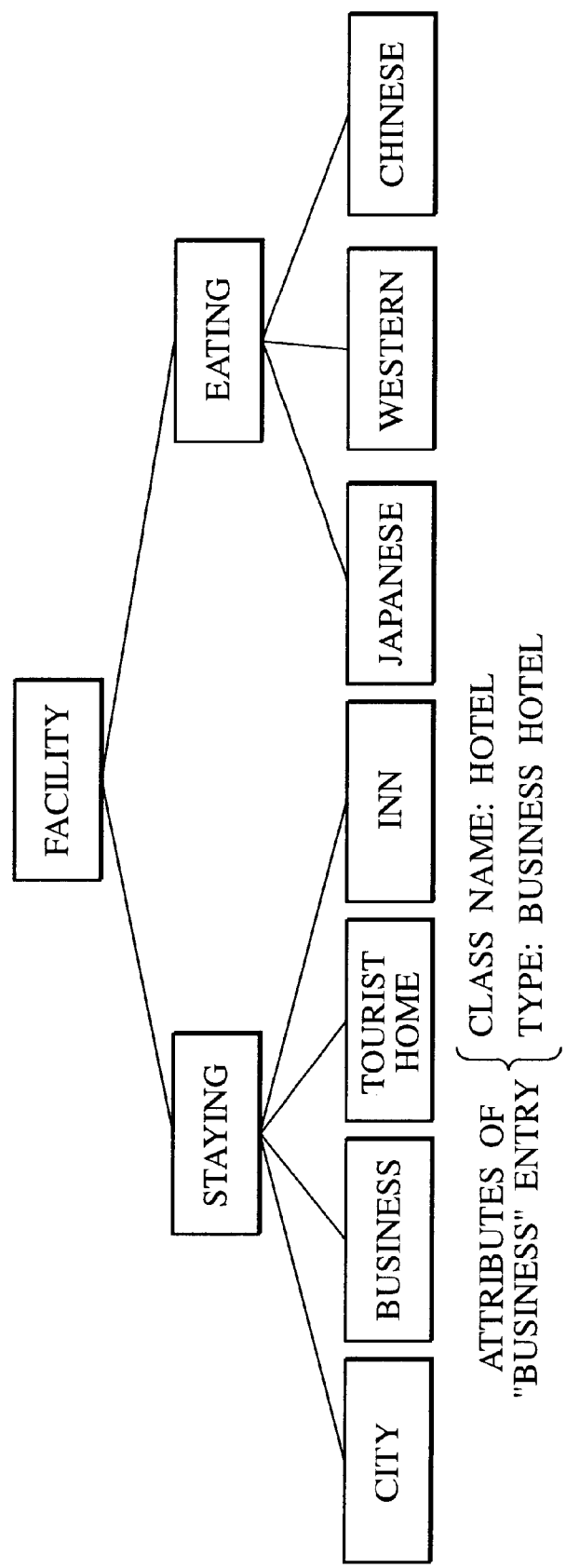
FIG. 5 is a diagram showing an exemplary classification tree for tourist facility information used in a concrete example of the classification tree based information retrieval apparatus of FIG. 1.
Figure 7A:
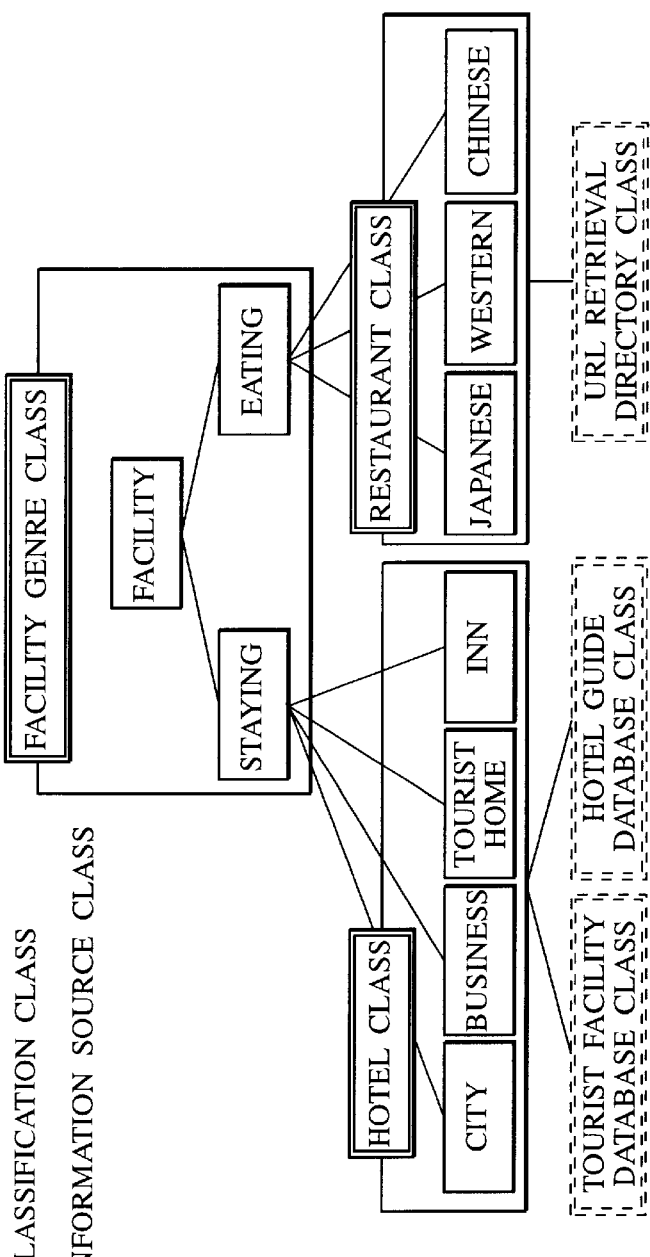
FIGS. 7A and 7B are diagrams showing an exemplary class structure for a classification tree of tourist facility information used in a concrete example of the classification tree based information retrieval apparatus of FIG. 1.
Figure 7B:
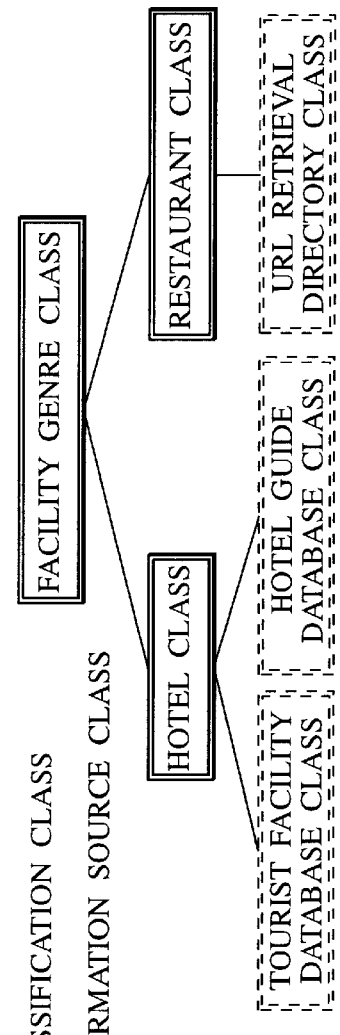

FIG. 5 shows a structure of the classification tree for the tourist facility information. FIG. 7A shows a class configuration of the tourist facility information classification tree, and FIG. 7B shows a hierarchical relationship among "facility genre class", "hotel class", and "restaurant class" that are belonging to the classification tree class and "tourist facility database class", "hotel guide database class", and "URL directory class" that are belonging to the information source class. From an entry information of the "hotel class" it is possible to retrieve information from the information sources belonging to the "tourist facility database class" and the "hotel guide database class", while from an entry information of the "restaurant class" it is possible to retrieve information from the information source belonging to the "URL directory class".

FIG. 8A shows the definition of the classification class for the tourist facility information classification tree, and FIGS. 6A and 6B show a structure and a registered content of the retrieval target information source databases (tourist facility database and the hotel guide database respectively). Also, FIG. 12 shows an information necessary in connecting to the tourist facility database.

First, at the preparation phase, the registration of the information source class 152 and the classification tree class 151 is carried out using the class definition registration unit 160. Also, the information source connection information of the database to be retrieved in this example is registered into a file, database, or directory.

(1) Definition of the classification tree class:

The classification class 151 for the classification tree of FIG. 5 is defined using the class definition registration unit 160. FIG. 8A shows the registration content.

FIG. 7A shows a class configuration with respect to each information classification (entry) of the classification tree of FIG. 5. Each of the entries "facility", "staying", "eating" belongs to the "facility genre class". Each of the entries "city", "business", "tourist home" and "inn" belongs to the "hotel class". Each of the entries "Japanese", "Western", and "Chinese" belongs to the "restaurant class".

Here, the registration content of the "hotel class" will be described in detail.

(i) Class name:

A name "hotel" for uniquely identifying the hotel class is set in this item.

(ii) Object class:

Among the object classes defined at the directory server in which the classification tree of FIG. 5 is stored, "hotel" to which the hotel class belongs is set in this item.

(iii) Attributes:

Attributes of the hotel class, i.e., "type" and "class name", are set in this item.

(iv) Retrieval condition:

(a) Retrieval condition group identifier:

Two types of the retrieval condition are to be set so that "1" and "2" are specified.

(b) Retrieval condition item name:

For the retrieval condition group identifier 1: A retrieval condition item name in the case of retrieving the hotel facility table of FIG. 6A that corresponds to the retrieval condition value attribute name to be described below is set in this item. In the case of this example, "hotel type" is set.

For the retrieval condition group identifier 2: A retrieval condition item name in the case of retrieving the hotel table of FIG. 6B that corresponds to the retrieval condition value attribute name to be described below is set in this item. In the case of this example, "classification" is set.

(c) Retrieval condition value attribute name:

For the retrieval condition group identifier 1: An attribute "type" of the hotel class by which the retrieval condition value corresponding to the above described retrieval condition item name "hotel type" can be obtained is set in this item.

For the retrieval condition group identifier 2: An attribute "type" of the hotel class by which the retrieval condition value corresponding to the above described retrieval condition item name "classification" can be obtained is set in this item.

(d) Comparison operator:

For both the retrieval condition group identifiers 1 and 2, the comparison operator "=" for the retrieval condition item and the retrieval condition value is set in this item.

(e) Retrieval condition conjunction:

For both the retrieval condition group identifiers 1 and 2, "null" is set in this item because there is no retrieval item to be concatenated in this example.

(2) Definition of the information source class:

The registration into the information source class 152 for the information source which has the retrieval target information is carried out using the class definition registration unit 160. Here, the registration content of the information source class for the tourist facility database is as follows.

(i) Class name:

A name "tourist facility database" for identifying the class is set in this item.

(ii) Information source type:

A "database" that indicates that the information source is a database is set in this item.

(iii) Retrieval item name:

The data items that can be retrieved in the class are registered by a table name and a column definition name at which each data item is stored. In this example, hotel type, name, address, and telephone number as shown in FIG. 6A will be the retrievable items, so that the registration is made in the following form.

Hotel facility table, hotel type

Hotel facility table, name

Hotel facility table, address

Hotel facility table, telephone number

Similarly, the registration of the information source class using the class definition registration unit 160 is also carried out for the hotel guide database and the URL directory.

(3) Information source connection information:

An information necessary for connecting to the information source is registered in this item. FIG. 12 shows the registration content. Here, the content of the tourist facility database is as follows.

(i) Class name:

"tourist facility database" that is described the class name of the information source class is set in this item.

(ii) Information source type:

"database" is set in this item.

(iii) Information source name:

"tourist facility database" which is the retrieval target database in this example is set in this item.

(iv) Host name:

The host name "Host1" in which the "tourist facility database" is stored is set in this item.

(v) Account:

The account name "user1" which is accessible to the "tourist facility database" is set in this item.

(vi) Password:

A password "**********" of the above account is set in this item.

(vii) Supplementary connection information:

Nothing is set in this item.

Similarly, the registration of the information source connection information is also carried out for the hotel guide database.

Next, the retrieval phase will be described.

(1) Operation of classification tree:

The user terminal device 600 makes an access to the classification tree 200 of the tourist facility information in the structure shown in FIG. 5 using the retrieval program 400 through the user interface unit 110 and the classification tree retrieval unit 130, and repeats the operation to trace the classification tree 200 until the retrieval target information classification (entry) is found. In this example, the tracing begins from "facility" and the information classification of "business" is selected as the retrieval target.

(2) Receiving of the retrieval request:

The information retrieval control unit 120 receives the information retrieval request from the retrieval program 400 through the user interface unit 110. The information retrieval request comprises "information classification", "retrieval item", and "retrieval condition", and FIG. 9 shows the content of each of these items.

(3) Acquisition of the attribute:

The information retrieval control unit 120 retrieves the entry "business" from the classification tree 200 in the structure of FIG. 4 according to the value "business" of "information classification" in the retrieval request, and obtains the class name "hotel" of that entry.

(4) Identification of the class definition:

The information retrieval control unit 120 retrieves the classification tree class 151 in the class definition unit 150, retrieves the class name "hotel" obtained by the above (3), and obtains the retrieval condition information. It is ascertained that the "hotel" class has two types of retrieval condition identified by the retrieval condition identifiers "1" and "2". The retrieval condition identifier 1 comprises "retrieval condition item"="hotel type", "retrieval condition value attribute name"="type", "comparison operator"="=", and "retrieval condition conjunction"="Null", while the retrieval condition identifier 2 comprises "retrieval condition item"="classification", "retrieval condition value attribute name"="type", "comparison operator"="=", and "retrieval condition conjunction"="Null".

(5) Generation of the information source retrieval command:
(a) First, the information retrieval control unit 120 retrieves the information source class 151 in the structure shown in FIG. 8B according to the retrieval item of the information retrieval request received by the above (3), and identifies the information source classes for which the retrieval item of the information retrieval request is contained among the retrieval items of the information source class 151 in the structure shown in FIG. 8B. In this example, the class name="tourist facility database" and the class name="hotel guide database" are identified as the information source classes.

(b) Next, whether the retrieval condition item name of the retrieval condition information obtained by the above (4) is contained among the retrieval item names of the "tourist facility database" class and the "hotel guide database" class that are identified by the above (5)(a).

The retrieval item "hotel type" of the retrieval condition identifier 1 of the "hotel" class coincides with the retrieval item name "hotel facility table. hotel type" of the "tourist facility database" class.

The retrieval item "classification" of the retrieval condition identifier 2 of the "hotel" class coincides with the retrieval item name "hotel table. classification" of the "hotel guide database" class.

Also, it can be seen that the information source type of the "tourist facility database" class and the "hotel guide database" is "database" from their information source type.

Next, the information retrieval control unit 120 generates the information source retrieval command. FIG. 10 shows the generated information source retrieval command. Here, the detailed procedure for the "tourist facility database" is as follows.

First, since the "retrieval condition value attribute" obtained by the above (4) is "type", the "business" entry of the classification tree 200 in the structure shown in FIGS. 7A and 7B is retrieved through the classification tree retrieval unit 130, the value "business hotel" of the "type" attribute of that entry is obtained, and the retrieval condition "hotel type=business hotel" is generated.

Then, the information source retrieval command shown in FIG. 11 is generated from the information source type "database", the retrieval item name of the information source class, and the above described retrieval condition "hotel type=business hotel".

(6) Addition of the retrieval condition:
The information retrieval control unit 120 adds the "retrieval condition" of the information retrieval request shown in FIG. 9 received by the above (2) to the retrieval condition of the information retrieval command of FIG. 10 generated by the above (5). At this point, the two retrieval conditions are connected by "AND". FIG. 11 shows the information retrieval command after this retrieval condition addition.

(7) Retrieval of the database:
The information retrieval control unit 120 gives the information retrieval command shown in FIG. 11 to the information source retrieval unit 140.

At the information source retrieval unit 140, the following database retrieval commands are generated from the received information source retrieval command.

(a) Retrieval command for the "tourist facility database":
"select hotel facility table. name, hotel facility table. address, hotel facility table. telephone number, from hotel facility table where hotel type=business hotel" AND area="Yokohama"

(b) Retrieval command for the "hotel guide database":
"select hotel table. name, hotel table. address, hotel table. telephone number from hotel table where classification=business hotel" AND area="Yokohama"

Next, the information source retrieval unit 140 obtains the host name, account and password from the information source connection information shown in FIG. 12 according to the "information source type"="database" and the "information source name"="tourist facility database" of the information source retrieval command, and issues the above described database retrieval command with respect to the "tourist facility database".

Similarly, for the "hotel guide database", the host name, account and password are obtained from the information source connection information, and the above described database retrieval command is issued with respect to the "hotel guide database".

(8) Returning of the retrieval result:
The information source retrieval unit 140 returns the retrieval result shown in FIG. 13 that is obtained by the execution of the database retrieval commands of the above (7) to the information retrieval control unit 120. In the retrieval of the "hotel guide database", the area specified by the retrieval condition does not exist so that it causes a retrieval error, and therefore the retrieval result only contains the retrieval result from the "tourist facility database".

The information retrieval control unit 120 returns the retrieval result shown in FIG. 13 to the retrieval program 400 through the user interface unit 110.

It is to be noted that the processing of this first embodiment can be recorded as a program in a recording medium such that the convenience in distribution can be enhanced by using that recording medium.

As described, according to the first embodiment of the present invention, the information location and the classification information are managed using the classification tree, the information containing the retrieval item and the retrieval condition for the purpose of retrieving the classification tree structure and the information source is managed as the class definition, and the retrieval with respect to a plurality of information sources is carried out by tracing entries stored in the information classification tree, so that it is possible to realize the information retrieval in which the information source and the information classification tree are separated, and thereby it becomes possible to share and reutilize the classification tree and the information source, it becomes easier to change the information classification, it becomes possible to add or delete information without updating the classification tree, it becomes easier to construct the information retrieval system using the classification tree, and it becomes possible to share the retrieval target information source. Also, by using this information retrieval scheme, it becomes unnecessary for the information retrieval application to construct a retrieval program with respect to the information source so that the system development, maintenance, and management efficiency can be improved.

Referring now to FIG. 14 to FIG. 17, the second embodiment of the information retrieval scheme according to the present invention will be described in detail.

In contrast to the first embodiment in which the classification tree based information retrieval apparatus is provided as a server connected with a user terminal device through a network, this second embodiment is directed to the case where the classification tree based information retrieval apparatus is provided as a part of a client device in a client-server system in which classification trees are provided by directory servers.

FIG. 14 shows a basic system configuration according to this second embodiment, where a directory server 1 provides classification trees with respect to contents (database) 3, while a client 5 having an application 5a, a classification tree retrieval unit 5b, an information retrieval control unit 5c, and a class definition unit 5d is provided. The client 5 carries out the retrieval with respect to the directory server 1 using the classification tree retrieval unit 5b which functions similarly as the classification tree retrieval unit 130 of the first embodiment. The client 5 also carries out the retrieval with respect to the contents 3 using the information retrieval control unit 5c which functions similarly as the information retrieval control unit 120 of the first embodiment and an externally provided contents acquisition and delivery server 9 which functions similarly as the information source retrieval unit 140 of the first embodiment.

In the system of FIG. 14, for each content 3 on a network such as image, speech, video, document, mail, program, or file, a location, access, and attribute information is provided in the directory server 1 as a new classification tree entry in a form of an object class where information containing this contents location, access, and attribute information is stored in a form of a contents management structure shown in FIG. 15 on the directory server 1.

Note that the system of this second embodiment may contain just a single directory server or a plurality of directory servers, and a single directory server may be provided on a single server host, or a plurality of directory servers may be provided on a single server host, or else a single directory server may be provided on a plurality of server hosts.

An application (AP) 5a of a client 5 can obtain a desired management information in a desired form (in a desired order, for example), by using the classification tree retrieval unit 5b which carries out the retrieval of the contents location, access, and attribute information from the directory server 1 using various conditions (filtering conditions). Note however that, for the purpose of the information retrieval scheme of the present invention, it suffices for the directory server 1 to manage at least the location information of each content and the client 5 to retrieve the location information of a desired content from the directory server 1.

By storing the management information of the contents on the directory server 1 and making it possible to obtain the management information through the directory server 1, it becomes possible to provide various accesses with respect to the contents. Also, by using an object class registration (copying) unit 7 for registering (copying) the object class into another directory server 1a, it becomes possible to realize the contents access in a distributed form.

The contents management structure of FIG. 15 comprises an "Entry Name" such as a label for identifying each content, a "Type" indicating a storing format of each content, a "Subtype" indicating a type of each content, an "WhereaboutInfo" which is a location information such as URL for indicating a location of each content, a "GetInfo" which is an information necessary in obtaining each content, i.e., an information to be transmitted to the information source at a time of accessing the information source such as "image/gif" indicating an image file in GIF format that is to be transmitted in the case of WWW access, and an "Attribute" of each content which is to be used by the application in order to retrieve the contents. Note that "Type" and "Subtype" are information necessary in decoding the encoded content, and it is not absolutely necessary to include them in the contents management structure.

The directory server 1 has an information storing function, an information retrieval function, an information registration/updating function, a schema definition function and an external cooperation function. Information stored by the information storing function is not in a tree structure, but the information stored in the directory server 1 is made to appear as in a tree structure by the functions of the information retrieval function and the information registration/updating function.

More specifically, the information retrieval function is a function for tracing the directory and retrieving individual entry. The information registration/updating function is a function for updating an attribute of each entry, adding a new entry, and deleting an existing entry. The schema definition function is a function for defining attribute groups that can be registered into the entries. The information storing function is a function for storing information of individual entry and a connection information among entries. The external cooperation function is a function for carrying out communications with external server hosts in the case of constituting a single directory on a plurality of server hosts, which operates in cooperation with the information retrieval function and the information registration/updating function.

In this system of FIG. 14, when the client 5 transmits a retrieval request to the directory server 1, the directory server 1 retrieves the contents management information that is stored as described above, and returns the contents location, access, and attribute information to the client 5. Then, the client 5 can obtain the desired retrieval information from the location information, using the contents acquisition and delivery server 9 such as WWW server, for example.

Figure 16:
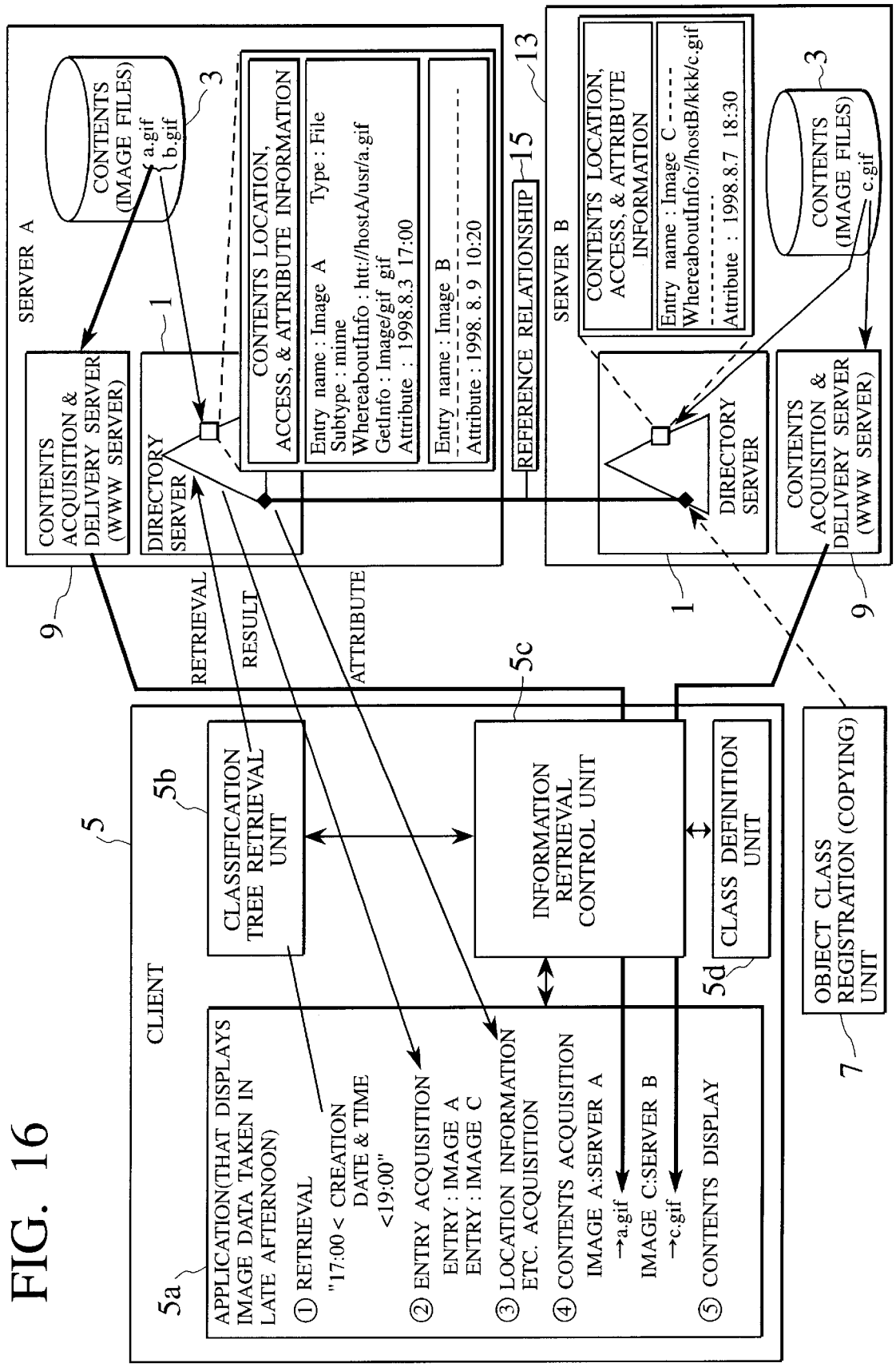
FIG. 16 is a block diagram showing a concrete example of a system configuration using a classification tree based information retrieval apparatus according to the second embodiment of the present invention.

FIG. 16 shows an exemplary detailed configuration of the system according to this second embodiment. In FIG. 16, the contents 3 are assumed to be image files stored on a server A 11 and a server B 13.

In this case, an exemplary contents management information is as shown in FIG. 17, which has "image A" as the Entry Name, "file" as the Type, "MIME" (Multipurpose Internet Mail Extensions) that is a data format commonly used on the Internet as the Subtype, the URL information in a form of "http://hostA/a.gif" as the WhereaboutInfo, "image/gif gif" as the GetInfo, and the creation date and time "1998.8.3 17:00" as the Attribute. Note that the object class of this contents management information is "contents". Also, in this example, the GetInfo stores the detailed information of MIME in a form of <media type/media subtype><suffix(can be plural)>.

Both the server A 11 and the server B 13 are in a state capable of utilizing the respective directory servers 1. Between the directory servers 1 of the server A 11 and the server B 13, a reference relationship 15 is defined and a setting for enabling the distributed access is made. The contents acquisition and delivery server 9 is assumed to be the WWW server in this example.

At the server A 11 and the server B 13, the location, access, and attribute (creation date and time) information of the image file is stored into the directory server 1 in advance. In this way, the access to the contents management information using LDAP (Lightweight Directory Access Protocol) becomes possible.

Note that LDAP is a directory access protocol for retrieving information stored in a directory, which has the following main retrieval functions.

Retrieving an entry (node) that satisfies a condition;

Retrieving entries subordinate to some entry (node); and

Retrieving an attribute information of an entry (node).

In the directory server 1 of this second embodiment, the location, access, and attribute information is stored as an attribute information of a directory entry so that it becomes possible to retrieve that attribute information by specifying an entry using LDAP. Note however that LDAP is only an example of a directory access protocol that can be used in the information retrieval scheme of the present invention, and the information retrieval scheme of the present invention is equally applicable to the case of using any other directory access protocol.

The application (AP) 5*a* of the client 5 carries out the retrieval of the management information by specifying the creation date and time of "since 17:00 until 19:00" as the retrieval condition, for example, using the classification tree retrieval unit 5*b*.

On the server A 11 an entry of the image A is retrieved, while on the server B 13 an entry of the image C is retrieved. The entry of the image C on the server B 13 is retrieved because of the reference relationship 15 of the directory server 1. Namely, it is assumed that the image A and the image C are in a relationship of being corresponding to some entry simultaneously although they are located on different servers, and the reference relationship 15 is defined such that an entry on the server B 13 is set in correspondence to an entry on the server A 11, so that when the entry on the server A 11 is retrieved, the entry information on the server B 13 is also returned to the client 5.

In this contents management system of FIG. 16, when the client 5 transmits a retrieval request specifying "since 17:00 until 19:00", for example, to the directory server 1, the directory server 1 retrieves the contents management information that is stored as described above. As a result, the entry of the image A is retrieved at the server A 11 while the entry of the image C is retrieved at the server B 13. From the Entry Name (+bind information) of each of these retrieved images A and C, the location information (WhereaboutInfo) is obtained using the classification tree retrieval unit 5*b*. For the image A, the location information of "http://hostA/usr/a.gif" is obtained, and for the image C, the location information of "http://hostB/kkk/c.gif" is obtained. Using these location information, the image files are obtained from the contents acquisition and delivery server 9 (WWW server), and the obtained image files are displayed.

It is to be noted here that, conventionally, a system utilizing a directory has been used only for the management of accounts or addresses of PC (personal computers) and WS (workstations).

Also, for acquisition and delivery of contents, a dedicated server for individual contents has been provided, and used only by a dedicated AP (application).

However, the following problems are encountered conventionally.

(1) It is impossible to manage location, access and attribute information of various contents because a management structure has not been defined.

(2) A management structure for managing location, access and attribute information of contents must be defined as a new object class, but there is no mechanism for distributing a new object class so that contents cannot be retrieved by other servers.

(3) For an access to information stored in a directory, only a basic API (application interface) alone has been provided and no API that can easily access the contents management structure has been provided.

(4) When contents are distributed over a plurality of servers, a dedicated server and contents are integrally provided so that it is impossible to carry out a processing for accessing a plurality of servers.

In this regard, the second embodiment described above can provide a contents management scheme capable of sharing location, access and attribute information of contents among a plurality of servers by storing them in a directory server so that various accesses from clients can be handled.

More specifically, according to the second embodiment of the present invention, by storing the management information of the contents on the directory server and making it possible to obtain the management information through the directory server, it becomes possible to provide various accesses with respect to the contents that are distributedly stored on the network.

Also, according to the second embodiment of the present invention, it is possible to use various contents acquisition and delivery servers, and it becomes possible to realize accesses to the time series like contents or the spatially arranged contents in forms of thinning or ordering according to various retrieval conditions.

Also, according to the second embodiment of the present invention, it becomes easily possible to produce an application (AP) for retrieving and accessing various contents that are arranged distributedly.

It is also to be noted that, in the second embodiment described above, the class definition unit 5*d* is provided inside the client device 5, but it is also possible to provide the class defintion unit 5*d* outside of the client device 5 in the system of FIG. 14.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An information retrieval apparatus using classification trees with respect to a plurality of information sources connected to a network, each classification tree having a hierarchical structure defined in terms of entries, the apparatus comprising:

a class definition unit for managing classification tree class information for each classification tree class defined among entries constituting each classification tree, each classification tree class information indicating retrieval condition parameters for each classification tree class; and an information retrieval control unit for receiving from a user a retrieval request indicating a retrieval target entry that was obtained by the user by tracing the classification trees, generating retrieval commands with respect to selected information sources among said plurality of information sources by referring to each classification tree class information corresponding to the retrieval target entry that is managed by the class definition unit, obtaining a retrieval result of a retrieval with respect to the selected information sources using the retrieval commands, and returning the retrieval result to the user.

2. The apparatus of claim 1, wherein each classification tree class information indicates the retrieval condition parameters in terms of retrieval condition items and attributes of each classification tree class from which specific values of the retrieval condition items can be obtained, which are to be used in specifying retrieval conditions to be indicated by the retrieval commands.

3. The apparatus of claim 2, wherein each classification tree class information indicates the retrieval condition parameters also in terms of an operator for specifying a relationship between each retrieval condition item and a specific value obtained from a corresponding attribute of each classification tree class, which is to be used in specifying each retrieval condition.

4. The apparatus of claim 2, wherein each classification tree class information indicates the retrieval condition parameters also in terms of an operator for specifying a connecting relationship among a plurality of retrieval conditions to be indicated by each retrieval command.

5. The apparatus of claim 2, wherein the retrieval request also indicates retrieval items that are to be retrieved from the information sources, and the information retrieval control unit selects those information sources which are compatible with both the retrieval items indicated by the retrieval request and the retrieval condition items indicated by each classification tree class information of each classification tree class corresponding to the retrieval target entry as the selected information sources.

6. The apparatus of claim 5, wherein the class definition unit also manages information source class information for each information source class defined among said plurality of information sources, each information source class information indicating retrieval items that are retrievable from each information source class, and the information retrieval control unit selects the selected information sources by referring to each information source class information managed by the class definition unit.

7. The apparatus of claim 1, wherein the information retrieval control unit incorporates a retrieval condition specified by the retrieval request received from the user into the retrieval commands with respect to the selected information sources.

8. The apparatus of claim 1, further comprising a classification tree retrieval unit for carrying out a retrieval with respect to the classification trees for the retrieval target entry under a control of the information retrieval control unit.

9. The apparatus of claim 1, further comprising an information source retrieval unit for carrying out the retrieval with respect to the selected information sources under a control of the information retrieval control unit.

10. The apparatus of claim 1, further comprising a class definition registration unit for registering, correcting, or deleting each classification tree class information to be managed by the class definition unit.

11. The apparatus of claim 1, wherein the information retrieval apparatus is provided as a server connected with a user terminal device operated by the user through the network.

12. The apparatus of claim 1, wherein the information retrieval apparatus is provided as a part of a client device to be operated by the user in a client-server system while the classification trees are provided by at least one directory server in the client-server system.

13. The apparatus of claim 12, wherein each directory server manages at least one classification tree by storing at least a location information of each content stored in a corresponding information source.

14. The apparatus of claim 13, wherein each directory server retrieves the location information of a requested content upon receiving the retrieval request issued by the client device, and returns the location information of the requested content to the client device, such that the client device obtains a desired content from the corresponding information source according to the location information returned in response to the retrieval request.

15. The apparatus of claim 13, wherein each directory server manages said at least one classification tree by storing a location, access, and attribute information containing the location information of each content stored in the corresponding information source in a prescribed management structure.

16. The apparatus of claim 15, wherein the location, access, and attribute information is given in terms of an entry name of each content, a type indicating a storing format of each content, a subtype indicating a type of each content, the location information of each content, access information of each content that is necessary in accessing each content besides the location information, and attribute information of each content.

17. A method of information retrieval using classification trees with respect to a plurality of information sources connected to a network, each classification tree having a hierarchical structure defined in terms of entries, the method comprising the step of:

managing classification tree class information for each classification tree class defined among entries constituting each classification tree, each classification tree class information indicating retrieval condition parameters for each classification tree class; and controlling an information retrieval by receiving from a user a retrieval request indicating a retrieval target entry that was obtained by the user by tracing the classification trees, generating retrieval commands with respect to selected information sources among said plurality of information sources by referring to each classification tree class information corresponding to the retrieval target entry that is managed by the managing step, obtaining a retrieval result of a retrieval with respect to the selected information sources using the retrieval commands, and returning the retrieval result to the user.

18. The method of claim 17, wherein each classification tree class information indicates the retrieval condition parameters in terms of retrieval condition items and attributes of each classification tree class from which specific values of the retrieval condition items can be obtained, which are to be used in specifying retrieval conditions to be indicated by the retrieval commands.

19. The method of claim 18, wherein each classification tree class information indicates the retrieval condition parameters also in terms of an operator for specifying a relationship between each retrieval condition item and a specific value obtained from a corresponding attribute of each classification tree class, which is to be used in specifying each retrieval condition.

20. The method of claim 18, wherein each classification tree class information indicates the retrieval condition parameters also in terms of an operator for specifying a connecting relationship among a plurality of retrieval conditions to be indicated by each retrieval command.

21. The method of claim 18, wherein the retrieval request also indicates retrieval items that are to be retrieved from the information sources, and the controlling step selects those information sources which are compatible with both the retrieval items indicated by the retrieval request and the retrieval condition items indicated by each classification tree class information of each classification tree class corresponding to the retrieval target entry as the selected information sources.

22. The method of claim 21, wherein the managing step also manages information source class information for each information source class defined among said plurality of information sources, each information source class information indicating retrieval items that are retrievable from each information source class, and the controlling step selects the selected information sources by referring to each information source class information managed by the managing step.

23. The method of claim 17, wherein the controlling step incorporates a retrieval condition specified by the retrieval request received from the user into the retrieval commands with respect to the selected information sources.

24. The method of claim 17, further comprising the step of carrying out a retrieval with respect to the classification trees for the retrieval target entry under a control of the controlling step.

25. The method of claim 17, further comprising the step of carrying out the retrieval with respect to the selected information sources under a control of the controlling step.

26. The method of claim 17, further comprising the step of registering, correcting, or deleting each classification tree class information to be managed by the managing step.

27. The method of claim 17, wherein the managing step and the controlling step are carried out by a server connected with a user terminal device operated by the user through the network.

28. The method of claim 17, wherein the managing step and the controlling step are carried out by a client device to be operated by the user in a client-server system while the classification trees are provided by at least one directory server in the client-server system.

29. The method of claim 28, further comprising the step of managing at least one classification tree at each directory server by storing at least a location information of each content stored in a corresponding information source.

30. The method of claim 29, further comprising the step of retrieving the location information of a requested content upon receiving the retrieval request issued by the client device, and returning the location information of the requested content to the client device, at each directory server, such that the client device obtains a desired content from the corresponding information source according to the location information returned in response to the retrieval request.

31. The method of claim 29, further comprising the step of managing said at least one classification tree at each directory server by storing a location, access, and attribute information containing the location information of each content stored in the corresponding information source in a prescribed management structure.

32. The method of claim 31, wherein the location, access, and attribute information is given in terms of an entry name of each content, a type indicating a storing format of each content, a subtype indicating a type of each content, the location information of each content, access information of each content that is necessary in accessing each content besides the location information, and attribute information of each content.

33. A computer usable medium having computer readable program code means embodied therein for causing a computer to function as an information retrieval apparatus using classification trees with respect to a plurality of information sources connected to a network, each classification tree having a hierarchical structure defined in terms of entries, the computer readable program code means includes:

first computer readable program code means for causing said computer to manage classification tree class information for each classification tree class defined among entries constituting each classification tree, each classification tree class information indicating retrieval condition parameters for each classification tree class; and second computer readable program code means for causing said computer to control an information retrieval by receiving from a user a retrieval request indicating a retrieval target entry that was obtained by the user by tracing the classification trees, generating retrieval commands with respect to selected information sources among said plurality of information sources by referring to each classification tree class information corresponding to the retrieval target entry that is managed by the first computer readable program code means, obtaining a retrieval result of a retrieval with respect to the selected information sources using the retrieval commands, and returning the retrieval result to the user.

34. The computer usable medium of claim 33, wherein each classification tree class information indicates the retrieval condition parameters in terms of retrieval condition items and attributes of each classification tree class from which specific values of the retrieval condition items can be obtained, which are to be used in specifying retrieval conditions to be indicated by the retrieval commands.

35. The computer usable medium of claim 34, wherein each classification tree class information indicates the retrieval condition parameters also in terms of an operator for specifying a relationship between each retrieval condition item and a specific value obtained from a corresponding attribute of each classification tree class, which is to be used in specifying each retrieval condition.

36. The computer usable medium of claim 34, wherein each classification tree class information indicates the retrieval condition parameters also in terms of an operator for specifying a connecting relationship among a plurality of retrieval conditions to be indicated by each retrieval command.

37. The computer usable medium of claim 34, wherein the retrieval request also indicates retrieval items that are to be retrieved from the information sources, and the second computer readable program code means selects those information sources which are compatible with both the retrieval items indicated by the retrieval request and the retrieval condition items indicated by each classification tree class information of each classification tree class corresponding to the retrieval target entry as the selected information sources.

38. The computer usable medium of claim 37, wherein the first computer readable program code meas also manages information source class information for each information source class defined among said plurality of information sources, each information source class information indicating retrieval items that are retrievable from each information source class, and the second computer readable program code means selects the selected information sources by referring to each information source class information managed by the first computer readable program code means.

39. The computer usable medium of claim 33, wherein the second computer readable program code means incorporates a retrieval condition specified by the retrieval request received from the user into the retrieval commands with respect to the selected information sources.

40. The computer usable medium of claim 33, further comprising third computer readable program code means for causing said computer to carry out a retrieval with respect to the classification trees for the retrieval target entry under a control of the second computer readable program code means.

41. The computer usable medium of claim 33, further comprising third computer readable program code means for causing said computer to carry out the retrieval with respect to the selected information sources under a control of the second computer readable program code means.

42. The computer usable medium of claim 33, further comprising third computer readable program code means for causing said computer to register, correct, or delete each classification tree class information to be managed by the first computer readable program code means.

43. The computer usable medium of claim 33, wherein the information retrieval computer usable medium is provided as a server connected with a user terminal device operated by the user through the network.

44. The computer usable medium of claim 33, wherein the information retrieval computer usable medium is provided as a part of a client device to be operated by the user in a client-server system while the classification trees are provided by at least one directory server in the client-server system.

45. The computer usable medium of claim 44, wherein each directory server manages at least one classification tree by storing at least a location information of each content stored in a corresponding information source.

46. The computer usable medium of claim 45, wherein each directory server retrieves the location information of a requested content upon receiving the retrieval request issued by the client device, and returns the location information of the requested content to the client device, such that the client device obtains a desired content from the corresponding information source according to the location information returned in response to the retrieval request.

47. The computer usable medium of claim 45, wherein each directory server manages said at least one classification tree by storing a location, access, and attribute information containing the location information of each content stored in the corresponding information source in a prescribed management structure.

48. The computer usable medium of claim 47, wherein the location, access, and attribute information is given in terms of an entry name of each content, a type indicating a storing format of each content, a subtype indicating a type of each content, the location information of each content, access information of each content that is necessary in accessing each content besides the location information, and attribute information of each content.

* * * * *

UNITED STATES PATENT AND TRADEMARK OFFICE
CERTIFICATE OF CORRECTION

PATENT NO. : 6,363,375 B1 Page 1 of 1
DATED : March 26, 2002
INVENTOR(S) : Takashi Hoshino, Yasushi Hasegawa, Giichi Kishimoto and Kinji Kato It is certified that error appears in the above-identified patent and that said Letters Patent is hereby corrected as shown below:

<u>Title page,</u>
Item [73], change "Company" to -- Corporation --.

Signed and Sealed this

Twenty-fourth Day of September, 2002

Attest:

Attesting Officer

JAMES E. ROGAN
*Director of the United States Patent and Trademark Office*